(12) United States Patent
Reilly et al.

(10) Patent No.: US 9,073,791 B2
(45) Date of Patent: Jul. 7, 2015

(54) METHOD OF FORMING A SILICON CARBIDE BODY

(71) Applicant: SAINT-GOBAIN CERAMICS & PLASTICS, INC., Worcester, MA (US)

(72) Inventors: Christopher J. Reilly, Whitinsville, MA (US); Yu Zhong, Shrewsbury, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/100,379

(22) Filed: Dec. 9, 2013

(65) Prior Publication Data

US 2014/0144878 A1 May 29, 2014

Related U.S. Application Data

(62) Division of application No. 13/341,567, filed on Dec. 30, 2011, now abandoned.

(60) Provisional application No. 61/428,289, filed on Dec. 30, 2010.

(51) Int. Cl.
| | |
|---|---|
| C04B 41/87 | (2006.01) |
| C04B 35/622 | (2006.01) |
| C04B 35/565 | (2006.01) |
| C04B 35/63 | (2006.01) |
| C04B 41/86 | (2006.01) |
| C04B 41/00 | (2006.01) |
| C04B 41/50 | (2006.01) |

(52) U.S. Cl.
CPC .............. *C04B 35/622* (2013.01); *C04B 35/565* (2013.10); *C04B 35/6316* (2013.01); C04B 2235/3217 (2013.01); C04B 2235/3272 (2013.01); C04B 2235/3826 (2013.01); C04B 2235/405 (2013.01); C04B 2235/428 (2013.01); C04B 2235/46 (2013.01); C04B 2235/658 (2013.01); C04B 2235/6586 (2013.01); C04B 2235/663 (2013.01); *C04B 41/86* (2013.01); *C04B 41/87* (2013.01); *C04B 41/009* (2013.01); *C04B 41/5022* (2013.01); *C04B 41/5031* (2013.01); *C04B 41/5037* (2013.01)

(58) Field of Classification Search
CPC ............ C04B 41/5338; C04B 41/5346; C04B 35/565; C04B 41/009; C04B 41/5022; C04B 30/02; C04B 2235/3826; C04B 2235/663; C04B 41/5392; C04B 41/91
See application file for complete search history.

(56) References Cited

U.S. PATENT DOCUMENTS

| | | | |
|---|---|---|---|
| 5,538,675 A | 7/1996 | Dunmead et al. | |
| 5,609,912 A | 3/1997 | Lackey et al. | |

(Continued)

FOREIGN PATENT DOCUMENTS

JP    11278957 A    10/1999

OTHER PUBLICATIONS

G.X. Wang et al., "Oxidation Mechanism of Si3N4-bonded SiC Ceramics by CO, CO2 and Steam", Journal of Materials Science, vol. 33, year 1998, pp. 1309-1317.*

(Continued)

*Primary Examiner* — Lan Vinh
*Assistant Examiner* — Jiong-Ping Lu
(74) *Attorney, Agent, or Firm* — Abel Law Group, LLP; Robert N Young

(57) ABSTRACT

A method of forming a ceramic article includes providing a ceramic body comprising silicon carbide, and treating the ceramic body in an atmosphere comprising an oxidizing material to remove a portion of the ceramic body through a chemical reaction between a portion of the ceramic body and the oxidizing material.

12 Claims, 4 Drawing Sheets

(56) References Cited

U.S. PATENT DOCUMENTS

| | | |
|---|---|---|
| 7,732,026 B2 | 6/2010 | Bryden |
| 2005/0253313 A1 | 11/2005 | Rashed |

OTHER PUBLICATIONS

A. Zymia et al., "Oxidation of Silicon Nitride Bonded Silicon Carbide Refractory Material in Air and Carbon Dioxide", Key Engineering Materials, vol. 206-213, year 2002, pp. 1655-1658.*

The International Search Report and the Written Opinion for International Application No. PCT/US2011/068173 received from the International Searching Authority (ISA/KR), dated Jul. 30, 2012, 7 pages.

Ming-Jong Wang et al., "Synthesis and characterization of silicon nitride whiskers," Department of Materials Science and Engineering, The University of Michigan, Ann Arbor, Michigan, USA, Journal of Materials Science, 25, dated 1990, pp. 1690-1698.

Zymla et al. "Oxidation of silicon nitride bonded silicon carbide refractory material in air and carbon dioxide," Key Engineering Materials, 2002, vols. 206-213, pp. 1655-1658.

* cited by examiner

METHOD OF FORMING A SILICON CARBIDE BODY

CROSS-REFERENCE TO RELATED APPLICATIONS

This application is a divisional application of and claims priority under 35 U.S.C. §120 to U.S. patent application Ser. No. 13/341,567 entitled "Silicon Carbide Body and Method of Forming Same," by Reilly et al., filed Dec. 30, 2011, which claims priority under 35 U.S.C. §119(e) to U.S. Patent Application No. 61/428,289 entitled "Silicon Carbide Body and Method of Forming Same," by Reilly et al., filed Dec. 30, 2010, both of which are assigned to the current assignee hereof and incorporated herein by reference in their entireties.

BACKGROUND

1. Field of the Disclosure

The following is directed to a method of forming a ceramic article, and particularly, a method of forming a silicon carbide body.

2. Description of the Related Art

Silicon carbide-based ceramic materials are utilized in many applications for their refractory properties and mechanical properties. Among the types of silicon carbide-based ceramics available, various types exist based on the particular forming process, including for example, sintered silicon carbide, hot pressed silicon carbide, and recrystallized silicon carbide. Each of the various types of silicon carbide bodies can have distinct features. For example, sintered silicon carbide (such as Hexoloy®) can be a very dense material, but is generally expensive and complex to produce. On the other hand, more cost effective but relatively porous silicon carbide materials such as nitride-bonded silicon carbide (known by acronyms such as NBSC and NSIC) have found practical use in refractory applications. Such refractory components include furnace or kiln furniture utilized in connection with holding or supporting work pieces during firing operations, as well as refractory lining materials and structural walls defining the furnace heating area.

However, certain process limitations still exist for certain silicon carbide bodies. In particular reference to nitride-bonded silicon carbide, during formation of the body, fibers of silicon nitride are formed on the surface body. Such fibers can roughen the surface, limit the ability to conduct post-forming processes, and change the appearance of the body, which may be unsuitable for a customer's intended use. Accordingly, it is common in the industry to remove the silicon nitride fibers from the material prior to further processing. The fibers are removed through physical techniques, such as sandblasting the surface of the silicon carbide body. Such processes are time consuming and often limited in efficacy.

SUMMARY

According to one aspect, a method of forming a ceramic article includes providing a ceramic body comprising silicon carbide, and treating the ceramic body in an atmosphere comprising an oxidizing material to remove a portion of the ceramic body through a chemical reaction between a portion of the ceramic body and the oxidizing material.

In another aspect, a method of forming a ceramic article includes providing a ceramic body comprising a fibrous material overlying an exterior surface of the ceramic body and treating the ceramic body with a gaseous reactant material to remove the fibrous material from the ceramic body through a chemical reaction between the gaseous reactant material and the fibrous material.

Yet another aspect includes a method of forming a ceramic article comprising firing a ceramic body comprising silicon carbide in a first atmosphere and treating the ceramic body in a second atmosphere after firing, wherein the second atmosphere is different than the first atmosphere and comprises a reactant material that chemically reacts with the ceramic body and removes a portion of the ceramic body.

In still another aspect, a body includes nitride-bonded silicon carbide, wherein the body comprises pores at an exterior surface and a majority of the pores are defined by smooth, non-fibrous surfaces when viewed at a magnification of at least 1000× for at least 2 random locations across the exterior surface of the body.

According to one aspect, a ceramic article includes a body having nitrogen-bonded silicon carbide having a non-fibrous exterior surface, wherein a non-fibrous exterior surface is defined by a surface having not greater than 10 fibers per 100 square microns at a magnification of at least 1000× for at least 2 random locations across the exterior surface of the body.

DETAILED DESCRIPTION

The following is directed to ceramic articles comprising silicon carbide and methods of forming such articles. More particularly, the following is directed to refractory bodies incorporating silicon carbide, and can include nitride-bonded silicon carbide compositions. Reference herein to nitride-bonded silicon carbide can include ceramic bodies that have a majority content of silicon carbide. The bodies can also include some content of other materials including nitrides, oxides, carbides, silicon, oxynitrides, and a combination thereof.

Figure 1:
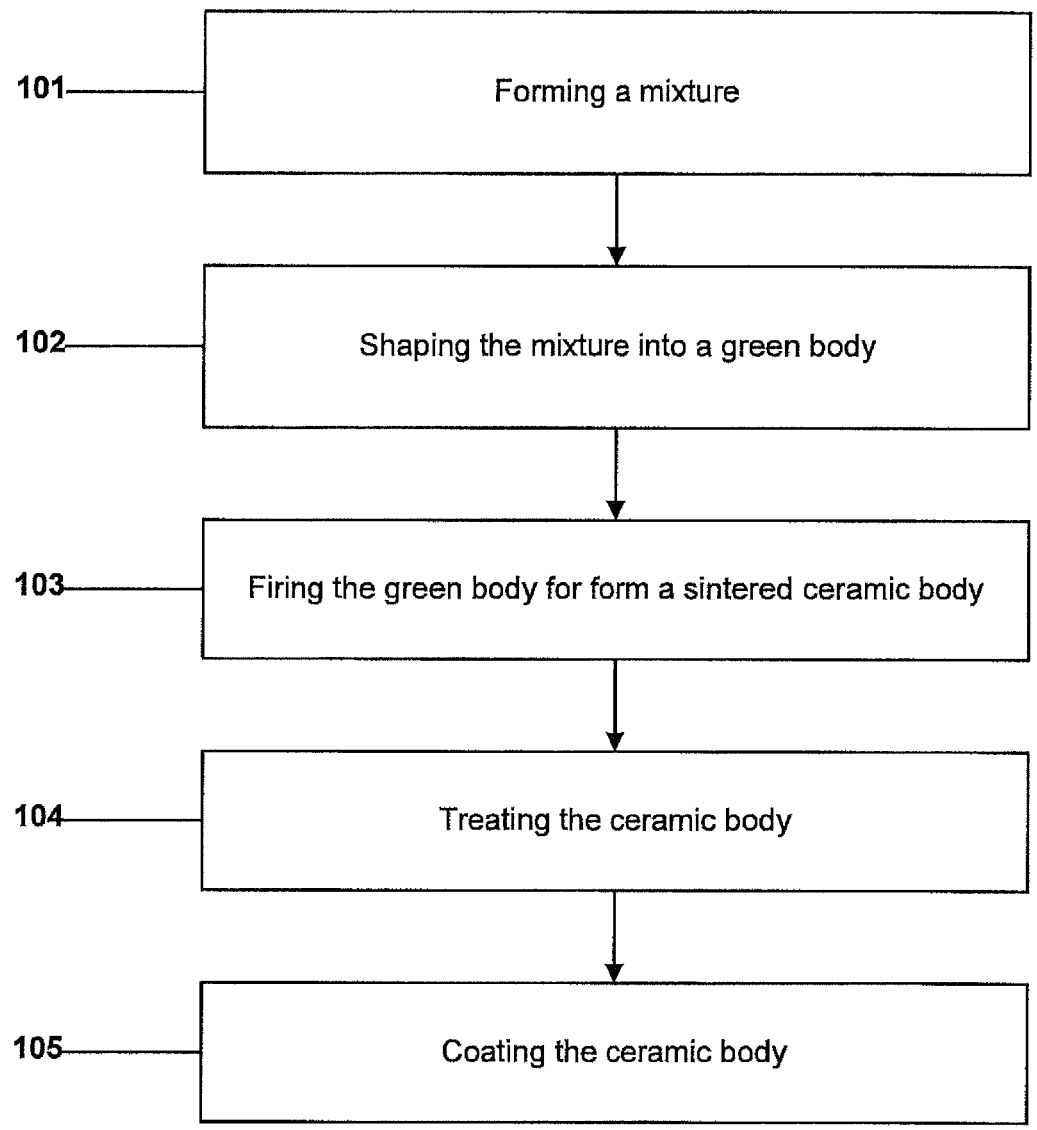
FIG. 1 includes a flow chart describing a process for forming a ceramic article in accordance with an embodiment.

In reference to the method of forming a ceramic article in accordance with an embodiment, FIG. 1 provides a flow chart illustrating a process of forming such articles. As illustrated, the process of forming a ceramic article can be initiated by forming a mixture at step 101. The mixture can include a combination of powder components which may be mixed together in a dry form. Alternatively, the mixture may be in the form of a slurry, including a liquid vehicle containing a mixture of powder material.

The process of forming a mixture can include blending fine and coarse silicon carbide powder materials together. The fine silicon carbide powder can have an average particle size that is less than an average particle size of the coarse silicon carbide powder. The difference in the average particle size between the fine and the coarse silicon carbide powders can be at least about 10% based on the larger of the two particles. The mixture can include a bimodal distribution of silicon carbide powder material, such that upon analysis of the mixture, two distinct modes defined by the distinct fine and coarse particle sizes are evident. Other mixtures can include more than two modes, such that the mixture can include a trimodal mixture of silicon carbide powders.

For example, the coarse silicon carbide particles can have an average particle size of at least about 40 microns, at least about 50 microns, at least about 60 microns, at least about 70 microns, or even at least about 80 microns. Still, the coarse silicon carbide particles can have an average particle size that is not greater than about 2500 microns, such as less than about 2000 microns, less than about 1500 microns, less than about 1000 microns, less than about 800 microns, less than about 500 microns, or even less than about 250 microns. The coarse silicon carbide powder can have an average particle size within a range between any of the minimum and maximum values noted above.

The fine silicon carbide powder can have an average particle size that is significantly less than the average particle size of the coarse silicon carbide powder. For example, the fine silicon carbide particles can have an average particle size of not greater than about 30 microns, such as not greater than about 25 microns, not greater than about 20 microns, not greater than about 15 microns, or even not greater than about 10 microns. Still, the fine silicon carbide particles can have an average particle size that is at least about 0.01 microns, such as at least about 0.05 microns, at least about 0.1 microns, or even at least about 0.5 microns. The fine silicon carbide powder can have an average particle size within a range between any of the minimum and maximum values noted above.

The mixture can include a blend of fine and coarse silicon carbide powders, which can be placed in the mixture in an equal amount. However, in other instances, a greater or lesser amount of one of the fine or coarse silicon carbide powder can be used. In one particular embodiment, the mixture includes between about 30 wt % and about 50 wt % of each of the fine and coarse silicon carbide powders.

Certain other additive powder materials can be provided in the mixture. The additives can include powder components having a composition such as silicon, nitrides, carbides, oxides, borides, oxynitrides, oxyborides, and a combination thereof. Generally, the additives are present in minor amounts, such as less than about 25 wt %, not greater than about 20 wt %, not greater than about 15 wt %, not greater than about 10 wt %, or even not greater than about 5 wt % of the total weight of the mixture. For example, particular compositions incorporating some content of silicon can include at least about 10 wt %, such as at least about 12 wt %, at least about 14 wt %, or even at least about 16 wt % silicon. Still, in such embodiments, the amount of silicon can be not greater than about 25 wt %, not greater than about 22 wt %, not greater than about 20 wt %, or even not greater than about 18 wt %.

In reference to still other mixtures used in the formation of nitride-bonded silicon carbide bodies, use of materials such as oxides, oxynitrides, and nitrides, can be limited. For example, in particular instances, the presence of such materials may be not greater than about 12 wt %, such as not greater than about 10 wt %, not greater than about 8 wt %, or even not greater than about 5 wt %.

In one particular embodiment, the additives include materials such as aluminum oxide, iron oxide, and a combination thereof. For example, the mixture can include approximately 5 wt % alumina powder. Moreover, certain mixtures can include a minor amount of iron oxide, such as approximately 0.5 wt %. Furthermore, the mixture may include some content of silicon powder, generally on the order of 1 wt % to about 10 wt %.

After suitably forming the mixture at step 101, the process can continue at step 102 by shaping the mixture into a green body. It will be appreciated that reference to a green body is reference to an un-sintered body that has not undergone heat treatment to densify the body. The shaping process can include various operations including casting, molding, pressing, extruding, and a combination thereof. In one particular instance, the process of shaping the mixture into a green body includes a slip casting process. For a detailed description of techniques for forming a ceramic body, attention is drawn to U.S. Pat. No. 4,990,469, incorporated herein by reference. Other suitable shaping methods can include drip casting, pressing, pressure casting, extrusion, and other techniques.

After shaping the mixture into a green body at step 102 the process can continue at step 103 by firing the green body to form a sintered ceramic body. Firing can be conducted in a chamber at a particular firing temperature, such as at least about 800° C. In other instances, the firing temperature can be greater, such as at least about 900° C., at least about 1000° C., or even at least about 1050° C. In accordance with another embodiment, the firing temperature can be not greater than about 2000° C., such as not greater than about 1800° C., not greater than about 1500° C., or even not greater than about 1480° C. It will be appreciated that firing can be conducted at a firing temperature within a range between any of the minimum and maximum values noted above.

Firing may be conducted for a duration of at least about 1 hour. In other instances, the process of firing can be longer, such that the firing duration can be at least about 10 hours, such as at least about 25 hours, at least about 30 hours, at least about 40 hours, or even at least about 45 hours. In particular instances, the firing process can have a duration of firing within a range between about 10 hours and about 80 hours, such as between about 20 hours and about 65 hours. It will be appreciated that firing is generally considered the time between the increase in temperature as the green body is placed in the chamber to a time before the temperature is reduced in the housing and cooling is undertaken.

Firing may be conducted in a controlled atmosphere. In accordance with an embodiment, the atmosphere can be a reducing atmosphere. More particularly, the atmosphere during firing can include nitrogen. In certain processes, the atmosphere during firing can consist essentially of nitrogen. Such atmosphere may be effective in reacting silicon contained in the body with the nitrogen in the atmosphere, causing the formation of the silicon nitride as a secondary phase that bonds the primary silicon carbide phase and forms a nitride-bonded silicon carbide body.

Notably, during the firing process, certain fibrous materials may be formed on the ceramic body. The fibrous material may include a carbide, nitride, boride, or a combination thereof. In particular instances, the fibrous material includes silicon nitride fibers which are formed as a result of the firing process. Such fibers can have a needle-like shape, extend over substantially all of the major exterior surfaces of the body, and be microscopic. In some cases, the fibers may negatively affect post-sintering processes, particularly those directed to formation of a coating layer on the body.

After firing the green body to form a sintered ceramic body at step 103, the process can continue at step 104, by treating the ceramic body. In accordance with an embodiment, the process of treating the ceramic body can include inducing a chemical reaction that facilitates removal of a portion of the ceramic body through the chemical reaction between a reactant material within the chamber and a portion of the ceramic body. Notably, the process of treating the ceramic body may be conducted in the same chamber as firing is conducted, such that the ceramic body does not need to be removed after firing and placed in a different chamber. Accordingly, the treating process includes an in-situ chemical reaction to remove a portion of the ceramic body, which may be formed during the firing process.

Treating the ceramic body can include changing the atmosphere within the chamber after firing. Accordingly, the atmosphere during treating can be different than the atmosphere utilized during firing. It will be appreciated that reference to a different atmosphere is reference to two atmospheres, wherein one of the atmospheres differs from the other atmosphere by at least one elemental component, which can be in the form of a free element, composition, compound, and/or complex.

In accordance with an embodiment, treating the ceramic body includes utilizing an oxidizing material within the atmosphere to facilitate removal of a portion of the ceramic body through a chemical reaction that takes place between the oxidizing material and the ceramic body. The chemical reaction undertaken during treating of the ceramic body can facilitate removing material from an exterior surface of the ceramic body. In more particular instances, the reaction can facilitate removal of material from pores that extend into the interior volume of the ceramic body. As such, the process of treating the ceramic body can facilitate removal of the fibrous material from the exterior surface of the body, and pores extending into the interior volume of the body connected to the exterior surface.

In accordance with an embodiment, the oxidizing material may be a gaseous reactant material suitable for oxidizing a portion of the ceramic body. For example, the oxidizing material can include oxygen. One process can include an oxidizing material in the form of a compound including carbon. According to a particular embodiment, the oxidizing material can include carbon dioxide, and more particularly, the oxidizing material may consist essentially of carbon dioxide.

In certain instances, the process of treating the ceramic body can include a chemical reaction defining a phase transition of one or more chemical components involved in the chemical reaction. That is, for example, a portion of the body can be removed through a phase transition, such that a portion of the body transforms phases from a solid phase to a gas phase. In accordance with one particular reaction, treating of the ceramic body may be conducted such that an oxidizing material is introduced into the chamber, wherein the oxidizing material reacts with a portion of the ceramic body, which as a result, transforms the portion of the ceramic body from a solid phase material to a gas phase material.

The chemical reaction between the oxidizing material and a portion of the ceramic body can form a reaction product that may include an oxide material. For example, the oxide material can be a chemical compound including silicon. For instance, the oxide material that is a reaction product of the chemical reaction between the oxidizing material and the portion of the ceramic body can include silicon monoxide, and more particularly, may consist essentially of silicon monoxide.

Another, additional oxide material, separate from the one noted above, may be formed as a reaction product from treating the ceramic body. Such an oxide material can be in the form of a gas. More particularly, the reaction product can be a chemical composition including carbon. In certain instances, a reaction product of carbon monoxide can be formed as a result of the reaction between the ceramic body and the oxidizing material.

A reaction product comprising a nitrogen material may also be formed as a result of the reaction between a portion of the ceramic body and the gaseous reactant material. In certain instances, a reaction product of nitrogen gas may be formed, and more particularly, a reaction product consisting essentially of nitrogen gas can be the nitrogen reaction product.

In accordance with one particular embodiment, the reaction between a portion of the ceramic body comprising the fibrous silicon nitride material and a gaseous reactant material in the form of an oxidizing material can result in oxidation of the silicon nitride fibers, represented by the following chemical formula:

$$Si_3N_4 + 3CO_2 \rightarrow 3SiO + 3CO + 2N_2$$

The process of treating the ceramic body may be conducted at a particular temperature to facilitate the chemical reaction. In fact, it has been noted that a certain minimum threshold temperature may be utilized to drive the reaction, and below such a temperature, the reaction may not necessarily occur. For example, the process of treating the ceramic body can be conducted at a reaction temperature that is at least about 800° C. In other instances, the reaction temperature can be at least about 900° C., such as at least about 950° C., at least about 1000° C., at least about 1100° C., or even at least about 1200° C. In other instances, the process of treating the ceramic body may be conducted at a reaction temperature that is not greater than about 2000° C., such as not greater than about 1800° C., not greater than about 1500° C., or even not greater than about 1300° C. It will be appreciated that the reaction temperature can be within a range between any of the minimum and maximum value recited above.

Notably, the oxidizing material can be flowed through the processing chamber at a particular rate to facilitate the reaction. In fact, a certain flow rate may be utilized to ensure the chemical reaction between the portion of the ceramic body and the oxidizing material occurs. In one embodiment, the oxidizing material can be flowed into the chamber at a flow rate of at least 1 standard cubic foot per hour (scfh) or 0.028 cubic meters per hour. In still other embodiments, the process of treating the ceramic body can include flow of an oxidizing material through the chamber at a flow rate of at least about 2 scfh (0.057 cubic meters per hour), such as at least about 3 scfh (0.085 cubic meters per hour), at least about 4 scfh (0.11 cubic meters per hour), or even at least about 5 scfh (0.14 cubic meters per hour). Still, the flow rate of the oxidizing material into the chamber during the process of treating the ceramic body can be not greater than about 200 scfh (5.7 cubic meters per hour), such as not greater than about 175 scfh (5.0 cubic meters per hour), or even not greater than about 150 scfh (4.2 cubic meters per hour). It will be appreciated that the flow rate of oxidizing material through the chamber during treating of the ceramic body can be within a range between any of the minimum and maximum values noted above.

A certain amount of the atmosphere of the chamber during treating may contain the gaseous reactant material. The atmosphere of the chamber during treating can include at least about 50 vol % of the gaseous reactant material for the total volume of the chamber to facilitate the reaction. In more particular embodiments, at least about 60 vol %, such as at least about 70 vol %, at least about 80 vol %, at least about 90 vol %, or even essentially the entire volume of the chamber can be filled with the gaseous reactant material during the process of treating.

Treating can be conducted for a treatment duration of at least about 10 minutes. In other processes, the treatment duration can be longer, such as at least about 30 minutes, at least about 45 minutes, at least about 60 minutes, at least about 90 minutes, or at least about 120 minutes. In certain instances, the treatment duration can be not greater than about 24 hours, such as not greater than about 18 hours, not greater than about 12 hours, or even not greater than about 8 hours. It will be appreciated that the treatment duration can be within a range between any of the minimum and maximum values noted above.

In accordance with an embodiment, the process of treating the ceramic body can further include a cooling process, wherein the temperature within the chamber is decreased after firing to initiate the process of treating the ceramic body. Notably, the cooling process can be controlled such that the temperature is properly controlled to facilitate treating of the ceramic body. In one instance, the temperature is reduced after firing to initiate a cooling process, while maintaining the temperature above a particular threshold temperature to facilitate a reaction during the treating process. Upon cooling, the atmosphere within the chamber can be changed from the firing atmosphere to the treating atmosphere to initiate the treating process.

The resulting ceramic body can be a nitride-bonded silicon carbide body. In accordance with one embodiment, the ceramic body can have a Knoop hardness of at least about 1500 kg/mm$^2$. In other instances, the Knoop hardness can be greater, such as at least about 1800 kg/mm$^2$, such as at least about 2000 kg/mm$^2$, or even at least about 2500 kg/mm$^2$. In certain instances, the ceramic body can have a Knoop hardness of less than about 4000 kg/mm$^2$, such as less than about 3500 kg/mm$^2$, even less than about 3000 kg/mm$^2$, or even less than about 2700 kg/mm$^2$.

In accordance with another embodiment, the ceramic body can have a corrosion resistance, as measured by weight loss in 53% hydrochloric acid, not greater than 15 mg/cm$^2$ yr. In other instances, the corrosion resistance is better, having a weight loss that is not greater than about 12 mg/cm$^2$ yr, not greater than about 10 mg/cm$^2$ yr. Still, the weight loss can be at least 5 mg/cm$^2$ yr. It will be appreciated that the corrosion resistance can be within a range between any of the minimum and maximum values noted herein.

After treating, the nitride-bonded silicon carbide ceramic body can have a porosity of less than about 25 vol % of the total volume of the body. In other instances, the porosity of the ceramic body can be less, such as not greater than about 20 vol %, not greater than about 18 vol %, or even not greater than about 15 vol % of the total volume of the ceramic body. It will be appreciated that the porosity may be at least about 1 vol %, such as at least about 2 vol %, at least about 3 vol %, or even at least about 5 vol % of the total volume of the ceramic body. It will be appreciated that the total volume of porosity within the ceramic body can be within a range between any of the minimum and maximum values noted above.

Furthermore, a fraction of the porosity present within the ceramic body can be open porosity, which may be defined by a network of interconnected pores within the body that intersect the exterior surface. The nitride-bonded silicon carbide ceramic body generally contains at least about 1 vol %, such as at least about 5 vol %, at least about 8 vol %, or even at least about 10 vol % open porosity for the total volume of porosity within the body.

In accordance with another embodiment, the ceramic body can be formed such that it has a density that is at least about 75% of theoretical density. In other instances, the ceramic body can have a density that is at least about 80%, such as at least about 90%, at least about 92%, or even at least about 95% of theoretical density.

As further illustrated in FIG. 1, the process of forming a ceramic body can further include an optional step 105 which includes coating of the ceramic body. Coating of the ceramic body can include formation of a coating layer that overlies the exterior surface of the body. The coating may overlie essentially the entire exterior surface of the body such that the ceramic body is encapsulated by the coating layer. In accordance with an embodiment, the coating layer can include an oxide material. More particularly, the coating layer can include an alumina oxide material and/or a mullite material, which is an alumina silicate material ($3Al_2O_3.2SIO_2$). In more particular instances, the coating layer can include an amorphous phase. In still other instances, the coating layer can include a crystalline phase. Certain coating layers can include a combination of amorphous phase and crystalline phase wherein the crystalline phase may be mainly in the form of needle-shaped crystals comprising the alumina silicate material.

The process of forming the coating layer can be affected by spraying, dipping, brushing, and the like. For example, a spraying process can include an air sprayer to achieve a thin, uniform coating on the surface of the ceramic body. In other instances more complex shapes of ceramic body may include a submersion approach, such as dipping, wherein the ceramic body is placed in a slurry containing a mixture of the material components suitable for forming the coating layer.

After sufficiently coating the ceramic body with the desired material, the coating process can further include a heat treatment. Heat treatment can be conducted in a particular atmosphere, such as an oxidizing atmosphere, which can include ambient air. The heat treatment process can be conducted at elevated temperatures, such as on the order of at least about 1000° C., at least about 1100° C., or even at least about 1200° C. In such an instance, the material sprayed or otherwise coated on the nitride-bonded silicon carbide body can be oxidized to form the coating layer. Further aspects of the process of forming the coating layer and characteristics of the coating layer are set forth in U.S. Pat. No. 7,732,026 which is incorporated in its entirety by reference.

In particular reference to the nitrogen-bonded silicon carbide material (i.e., without an optional coating layer), the process of treating the ceramic body can facilitate the removal of fibrous material from the exterior surface of the body as well as pores within the body that may extend into the interior volume of the body. Such bodies are distinct from conventional nitrogen-bonded silicon carbide bodies, since conventional techniques for removing such fibrous growths on the body include mechanical abrading techniques including, for example, sand blasting techniques, which simply remove the fibers from the exterior surface of the body without removing the fibers from crevices and pores on the surface, and furthermore, can actually roughen the exterior surface of the body. Accordingly, the ceramic body of the embodiments herein can be characterized by smooth, non-fibrous surfaces when the exterior surface is viewed at magnifications of at least 1000× for at least two random locations across the exterior surface of the body.

In particular, the ceramic bodies of the embodiments herein are characterized by a non-fibrous exterior surface having not greater than 10 fibers per hundred square microns when viewed at a magnification of at least 1000× at two random locations on the exterior surface of the ceramic body. In fact, in other embodiments, the existence of fibers is even more scarce, such that the exterior surface of the ceramic body is characterized by having not greater than 5 fibers per 100 square microns, not greater than 1 fiber per 100 square microns, not greater than about 1 fiber per 500 square microns, or even not greater than 1 fiber per 1000 square microns when at least 2 random locations on the exterior surface of the body are viewed at a magnification of at least 1000×.

EXAMPLE

A nitride-bonded silicon carbide body is formed according to embodiments herein by initially combining the components provided in Table 1 below in a slurry. The sample of Example 1, formed according to the embodiments herein, is designated sample S1.

TABLE 1

| 6521-100F | SILICON CARBIDE GREEN | 35.5 wt % |
| 7662-30 | SILICON CARBIDE GREEN | 33.3 wt % |
| C-8774 | IRON OX #222 BAYER | 0.44 wt % |
| WD | DEIONIZED WATER | 11.01 wt % |
| C-8770 | A-3000FL CALCINED ALU | 4.44 wt % |
| C-8773 | ELKEM SI 0.30% FE | 15.07 wt % |

Figure 2:
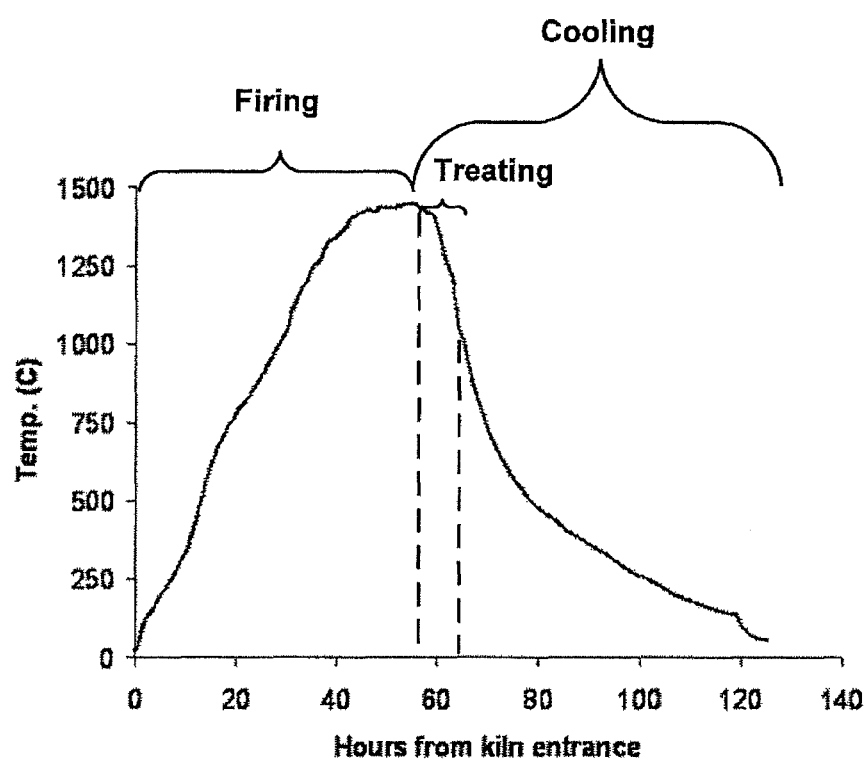
FIG. 2 includes a firing schedule of temperature versus hours for a ceramic body formed according to an embodiment.

After forming the initial mixture in the form of a slurry, the mixture is slip cast to form a green body. The green body is placed in a firing chamber wherein the temperature is increased to 700° C. at 100° C./hr and nitrogen gas is introduced into the chamber. Thereafter, the temperature is increased to approximately 1350° C. while nitrogen gas continues to flow. The temperature is increased to 1440° C. and is soaked for 6 hours in a nitrogen gas atmosphere. After 6 hours of firing at 1440° C., the nitrogen gas atmosphere is purged from the firing chamber and $CO_2$ is introduced as an oxidizing material within the chamber to react with a portion the fired silicon carbide body. $CO_2$ is flowed through the chamber at 4 scfh for approximately 5 hours while the temperature in the chamber is reduced and cooling of the ceramic body is initiated. After 5 hours of flowing $CO_2$ into the chamber, the atmosphere is again changed such that ambient air is flowed into the chamber while the ceramic body cools to room temperature. FIG. 2 includes a firing schedule demonstrating the temperature of the chamber during the process of forming the ceramic body of Example 1.

A conventional sample (C1) comprising nitride-bonded silicon carbide is formed according to a conventional process that utilizes a similar process as noted above with regard to sample S1; however, no treating process is conducted. The firing process to form sample C1 is the same as sample S1. However, after firing, no CO2 is introduced into the chamber. After cooling to room temperature, silicon nitride fibers are evident on the sample C1. No silicon nitride fibers are observable on the sample S1.

Sample C1 is sandblasted using 10-40 lbs of pressure and 24 mesh size grit of brown, fused alumina.

Figure 3:
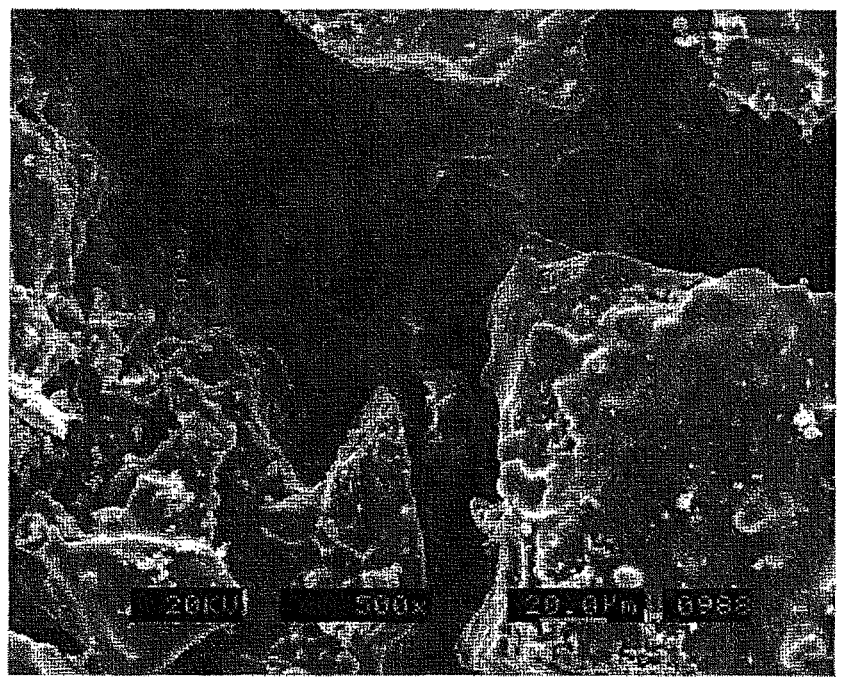
FIG. 3 includes a magnified image of a portion of a ceramic body in accordance with an embodiment.
Figure 4:
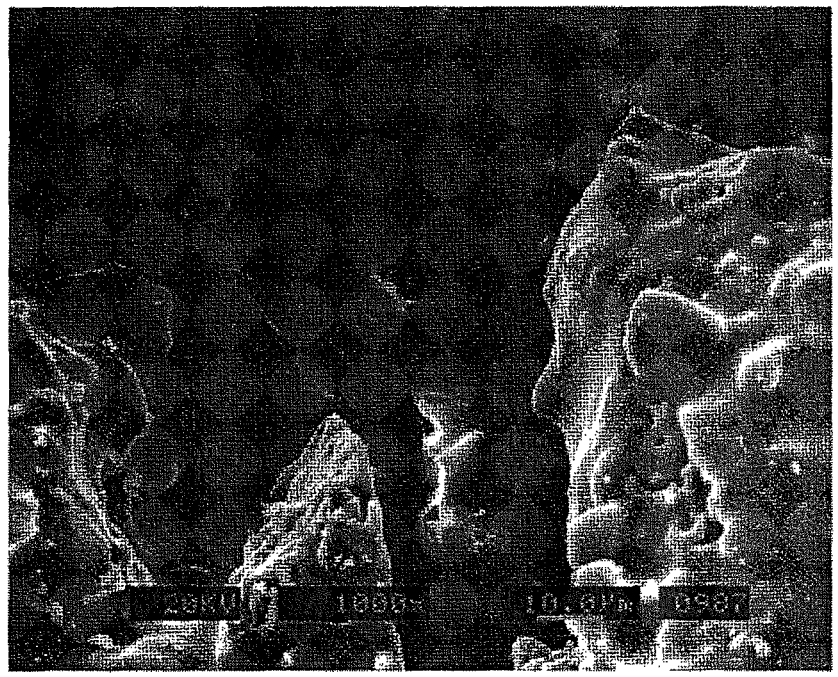
FIG. 4 includes a magnified image of a portion of a ceramic body in accordance with an embodiment.

FIGS. 3 and 4 include magnified images of a portion of the ceramic body of sample S1 formed according to the embodiments herein. FIGS. 3 and 4 include magnified images of pores on the exterior surface of the Sample S1. As clearly shown, sample S1 is essentially free of fibrous material on the exterior surface, even when observed at magnifications of 500× and 1000×.

Figure 5:
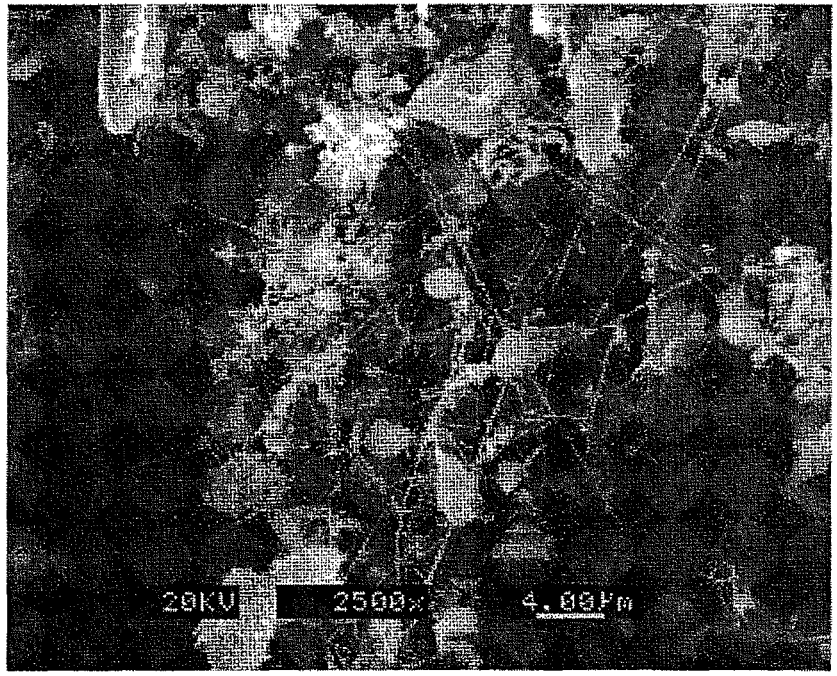
FIG. 5 includes a magnified image of a portion of a conventional ceramic body.
Figure 6:
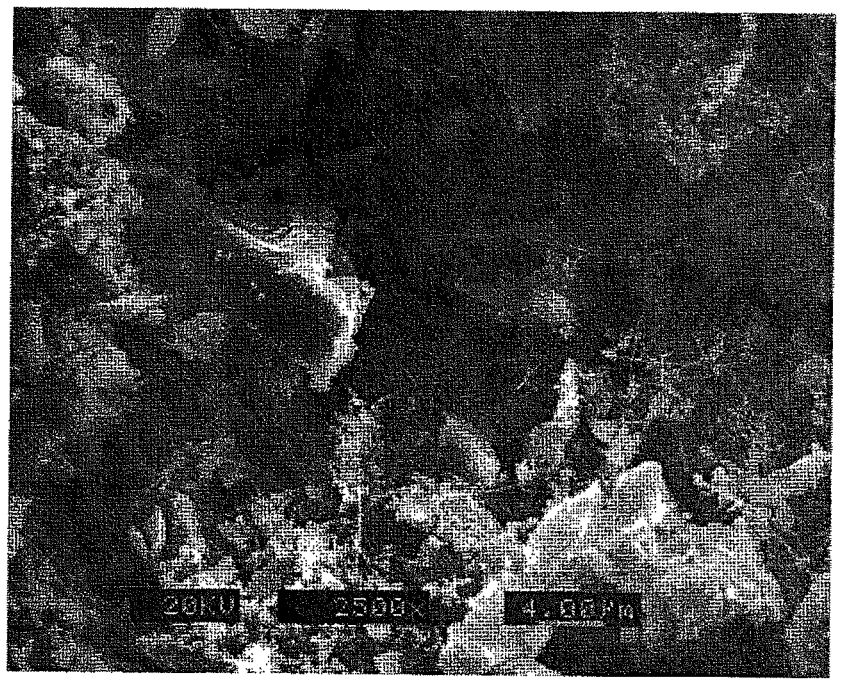
FIG. 6 includes a magnified image of a portion of a conventional ceramic body.

By comparison, a portion of the conventional sample is illustrated in the magnified images of FIGS. 5 and 6. Clearly, as shown in FIGS. 5 and 6, the conventional sample has fibers extending over the surface and obstructing the crevices and pores on the exterior surface of the ceramic body. Considering that the viewed area in each of FIGS. 5 and 6 is greater than 1000 square microns, clearly the concentration of fibers of sample C1 is significantly greater than that of sample S1, and more particularly, significantly greater than 10 fibers per hundred square microns.

The embodiments herein are directed to nitride-bonded silicon carbide articles and methods of forming such articles. The embodiments herein are directed to a combination of processing techniques configured to facilitate the formation of nitride-bonded silicon carbide bodies using a more efficient, streamlined process. Such features include a treating process, wherein a chemical reaction occurs between a portion of the silicon carbide body and a gaseous reactant material introduced into the firing chamber under particular conditions (e.g., temperature, pressure, duration, flow rate, etc.). Accordingly, portions of the body are removed in-situ, alleviating the need for future, time-consuming processing, which would otherwise be necessary to remove the undesirable portions.

Furthermore, the result of the unique combination of processing parameters results in an ceramic article having unique, identifiable features as compared to nitride-bonded silicon carbide bodies formed through conventional processing pathways. Such features include, but are not limited to, particularly low concentrations of fibrous material on the exterior surface, and mechanical features. The embodiments provide a combination of features, which can be combined in various manners to describe and define the refractory bodies of the embodiments. The description is not intended to set forth a hierarchy of features, but different features that can be combined in one or more manners to define the invention.

In the foregoing, reference to specific embodiments and the connections of certain components is illustrative. It will be appreciated that reference to components as being coupled or connected is intended to disclose either direct connection between said components or indirect connection through one or more intervening components, as will be appreciated, to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The disclosure is submitted with the understanding that it will not be used to interpret or limit the scope or meaning of the claims. In addition, in the foregoing disclosure, various features may be grouped together or described in a single embodiment for the purpose of streamlining the disclosure. This disclosure is not to be interpreted as reflecting an intention that the embodiments herein limit the features provided in the claims, and moreover, any of the features described herein can be combined together to describe the inventive subject matter. Still, inventive subject matter may be directed to less than all features of any of the disclosed embodiments.

What is claimed is:

1. A method of forming a ceramic article comprising:
   providing a ceramic body comprising silicon carbide and silicon nitride; and
   treating the ceramic body in an atmosphere comprising an oxidizing material to remove a portion of the ceramic body through a chemical reaction between a portion of the silicon nitride of the ceramic body and the oxidizing material to produce a silicon-containing material and a carbon-containing material, each of the silicon-containing material and the carbon-containing material being in a form of a gas, wherein the chemical reaction is represented by a chemical formula of:

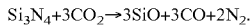

2. The method of claim 1, wherein the portion of the ceramic body comprising silicon nitride fibers.

3. The method of claim 2, wherein all products of the chemical reaction are in the form of gases.

4. The method of claim 1, wherein treating is performed in a chamber as a temperature of the chamber is decreasing.

5. The method of claim 1, wherein treating comprises providing the oxidizing material into a chamber containing the ceramic body at a flow rate of at least about 0.028 cubic meters per hour.

6. The method of claim 5, wherein during treating the oxidizing material is provided into the chamber at a flow rate of not greater than about 5.7 cubic meters per hour.

7. A method of forming a ceramic article comprising:
providing a ceramic body comprising a nitrogen-bonded silicon carbide and silicon nitride fibers; and
reacting the silicon nitride fibers and an oxidizing material to produce silicon monoxide and carbon monoxide, wherein reacting comprises a chemical reaction represented by a chemical formula of:

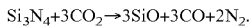

8. The method of claim 7, wherein reacting is performed at a reaction temperature of at least 800° C.

9. The method of claim 8, wherein the reaction temperature is not greater than about 1500° C.

10. The method of claim 8, wherein the reacting is performed in a chamber as a temperature of the chamber is decreasing.

11. A method of forming a ceramic article comprising:
providing a ceramic body comprising silicon carbide; and
treating the ceramic body in an atmosphere comprising an oxidizing material to remove a portion of the ceramic body through a chemical reaction between a portion of the ceramic body and the oxidizing material to produce a silicon-containing material in a form of a gas, wherein treating is performed in a chamber as a temperature of the chamber is decreasing.

12. The method of claim 11, wherein the chemical reaction is represented by a chemical formula of:

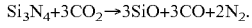

* * * * *

UNITED STATES PATENT AND TRADEMARK OFFICE
CERTIFICATE OF CORRECTION

Page 1 of 1

PATENT NO. : 9,073,791 B2
APPLICATION NO. : 14/100379
DATED : July 7, 2015
INVENTOR(S) : Christopher J. Reilly et al.

It is certified that error appears in the above-identified patent and that said Letters Patent is hereby corrected as shown below:

In the Claims

Column 12, line 8, please delete "claim 8" and insert --claim 9--

Signed and Sealed this
Twenty-ninth Day of March, 2016

Michelle K. Lee
*Director of the United States Patent and Trademark Office*